United States Patent [19]
Broyles

[11] Patent Number: 5,909,956
[45] Date of Patent: Jun. 8, 1999

[54] MOTORCYCLE TURN SIGNAL LENS COVER

[76] Inventor: Stephen G. Broyles, 2051 Belton, Garden City, Mich. 48135

[21] Appl. No.: 08/808,468

[22] Filed: Mar. 3, 1997

[51] Int. Cl.[6] ............................... F21V 33/00; B62J 6/00
[52] U.S. Cl. .................. 362/473; 362/310; 362/255; 362/806; 362/509; 362/520; 362/540
[58] Field of Search ..................... 362/473, 255, 362/806, 509, 520, 540

[56] References Cited

U.S. PATENT DOCUMENTS

| | | | |
|---|---|---|---|
| 1,712,661 | 5/1929 | Fuchs | 362/255 |
| 1,948,050 | 2/1934 | Rossi | 362/255 |
| 2,596,879 | 5/1952 | Warren | 362/255 |
| 4,320,906 | 3/1982 | Saunders, IV | 280/289 |
| 5,479,324 | 12/1995 | Barry | 362/72 |
| 5,634,287 | 6/1997 | Lamparter | 40/572 |

FOREIGN PATENT DOCUMENTS 209795  1/1924  United Kingdom .............. 362/240

*Primary Examiner*—Sandra O'Shea
*Assistant Examiner*—Marshall Honeyman
*Attorney, Agent, or Firm*—Weintraub & Brady

[57] ABSTRACT

A motorcycle turn signal translucent lens has a central opening formed therethrough. A decorative cover is secured to the lens via fastening means engaging the cover and the opening in the lens. The cover has a plurality of openings provided thereon, thus, allowing the lens to remain viewable. The lens is secured to a motorcycle turn signal housing by additional fastening means.

7 Claims, 1 Drawing Sheet

U.S. Patent    Jun. 8, 1999    5,909,956
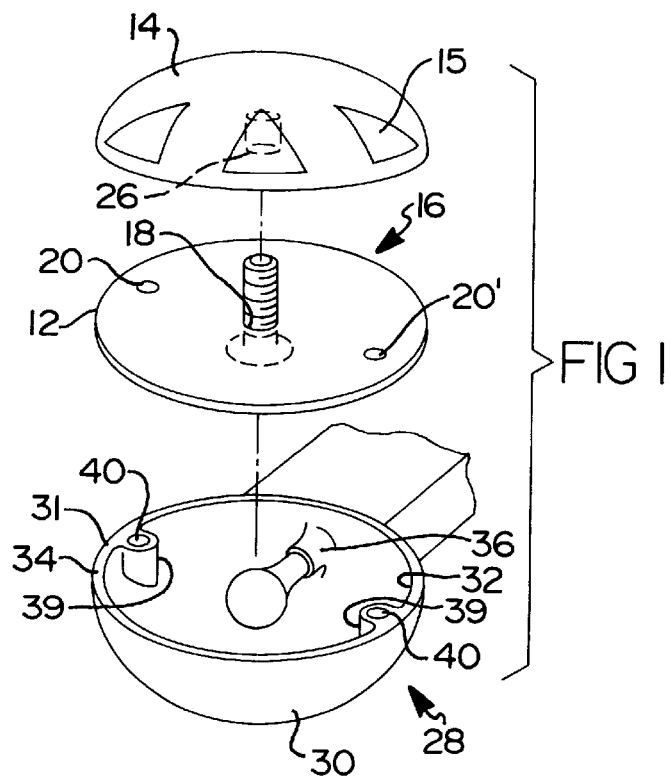
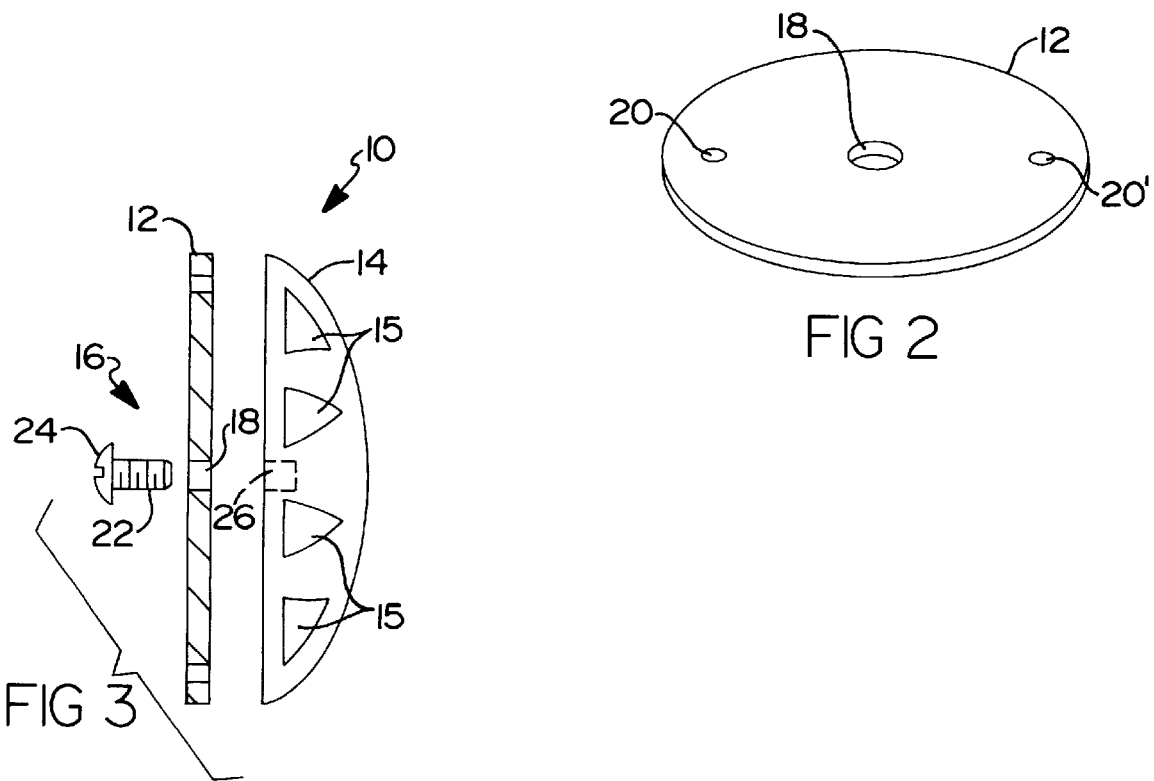

MOTORCYCLE TURN SIGNAL LENS COVER

BACKGROUND OF THE INVENTION

1. Field of the Invention

The present invention pertains to motorcycles. More particularly, the present invention pertains to motorcycle turn signals. Even more particularly, the present invention relates to lens covers for motorcycle turn signals.

2. Prior Art

Many users of vehicles, including users of motorcycles, like to personalize their vehicles via decorative additions. Examples of such motorcycle decorative additions abound, a few being chrome exhaust pipes, points covers, saddle bags, extra lights, etc. These additions render the vehicle visually distinct such that even a casual observer can see the personalization.

As is known to those skilled in the art to which the present invention pertains, virtually every aspect of a motorcycle has been provided with personalizing accoutrements, both at an Original Equipment Manufacturer (O.E.M.) level and in the aftermarket. Yet, heretofore, little attention has been paid to the motorcycle turn signals and the decorative enhancement thereof. While limited types of covers are available, heretofore there has not been available any means to integrate an existing decorative cover into a decorative turn signal lamp cover to enable matching the other decorative covers used to appoint the vehicle. It is to solving this that the present invention relates.

SUMMARY OF THE INVENTION

In accordance with the present invention, and in a first aspect hereof, there is provided a motorcycle turn signal lens cover assembly, the assembly comprising:

(a) a translucent motorcycle turn signal lens, the lens having at least one central first opening formed therethrough;

(b) a decorative cover which overlies the lens; and (c) means for interconnecting the cover to the lens through the central first opening.

The cover while decoratively enhancing the turn signal, does not interrupt or preclude visual observation of the turn signal. Thus, the signalling function is not impaired.

In another aspect hereof, the present invention comprises a translucent lens cover having a central threaded aperture formed therein, the lens cover or lens being mountable to a motorcycle turn signal. The lens cover further includes means for mounting the lens to a motorcycle turn signal housing. The central opening cooperates with a threaded fastener to define means for mounting a decorative cover to the lens.

In a further aspect hereof, there is provided a motorcycle turn signal having the decorative cover secured thereto via the lens hereof.

As noted, the decorative cover is at least partially open, thus, allowing the lens to remain viewable.

The lens is secured to the motorcycle turn signal by means for fastening.

For a more complete understanding of the present invention reference is made to the following detailed description and accompanying drawings. In the drawings, like reference characters refer to like parts throughout the several views, in which:

BRIEF DESCRIPTION OF THE DRAWINGS

FIG. 1 is an exploded, perspective view of a lens and motorcycle turn signal assembly in accordance with the present invention;

FIG. 2 is a top view of a lens according to the present invention, and

FIG. 3 is a side view, partly in cross-section, of a lens and decorative cover according to the present invention; and

DESCRIPTION OF THE PREFERRED EMBODIMENT

At the outset, it is to be noted that and as is known to the skilled artisan, typical motorcycle turn signals, generally, comprise a housing, such as an open hollow hemisphere, a light bulb socket within the housing, the socket being in electrical communication with the electrical system of the motorcycle which permits intermittent flashing of a light bulb inserted in the socket, upon actuation of the turn signal, and a lens fastened to the open portion of the hemispherical side wall. Usually, the lens is generally a translucent disk of colored plastic, either amber or red due to state and Federal regulations.

It is within the control of this environment that the present invention finds particular utility.

Now and with reference to the drawings, and in particular FIGS. 2 and 3 there is depicted therein turn signal lens or lens cover assembly in accordance with the present invention and, generally, denoted at 10. The assembly 10 includes a translucent lens 12 having a central threaded aperture 18 formed therein and a decorative cover 14.

More particularly, the lens 12 is, preferably, a planar disc, made of a translucent colored plastic, and is preferably circularly shaped. It must be noted, though, that the size and shape of the lens are further discussed hereinbelow.

Depending upon the type of decorative cover 14 used herein, the present invention may further include a threaded fastening member or fastener, such as a screw 16 which threadably interconnects the lens 12 and the cover 14.

The decorative cover 14 contemplated for use herein is made of any suitable material, such as a chrome-plated metal, stainless steel or plastic to match other decorative portions of a motorcycle. The cover 14 has openings 15 provided therein, thereby allowing a viewer to see the lens 12 after the cover 14 is attached thereto when it overlies the lens cover when in operative position.

In practicing the present invention, the cover 14 particularly contemplated for use herein is preferably a motorcycle "point" cover of the type well-known and commercially available. As is known, a point cover, generally, includes a central opening 26, which may or may not be threaded. The opening 26 registers with the opening 18 in the lens, thus, permitting the fastener 16 to threadably interconnect the cover 14 and the lens 12. Alternatively, although not shown, a fastener may project from the cover 14 and into the opening 18 with the head of the fastener bearing against the point cover 14.

Again, as is known, another type of point cover has a central stud or threaded post (not shown) projecting outwardly therefrom. This cover-associated central stud or post enables this latter type of cover to threadably mount to the lens and, thus, functions in the same manner as the fastener 16. Any of the types of covers 14 defined herein is usable herein since in any defined form a threaded fastener, whether integral with the cover or as a separate component enables connection of the cover 14 to the lens 12.

Where used, the screw 16 has a shaft 22 and a head 24. The shaft 22 is threaded and is of substantially the same diameter as that of the hole 18 in the lens and the aperture 26 in the cover. The length of the shaft 22 is greater than the thickness of the lens 12. The head 24 is larger than the shaft 22.

The at least one screw 16 threadably engages the central opening 18 in the lens 12, projecting entirely therethrough, and threadably engages the aperture 26 in the cover 14, thus fastening the cover 14 to the lens 12. The screw 16 cannot completely enter the lens 12 and cover 14 because the head 24 is larger than the shaft, and thus larger than the opening 18 and the aperture 26 and, thus, bears thereagainst, as shown.

As described hereinabove, the lens 12 is preferably a circularly shaped translucent disk since substantially all turn signal housings have a circular opening. However, to the extent that other geometric configurations are necessary to conform the lens to the configuration of the housing opening, such are within the ambit hereof. As shown in FIG. 1, the lens 12 is adapted to fit into a typical turn signal assembly 28 of a motorcycle (not shown). The turn signal assembly 28 has an exterior side wall 30 that is of any desired configuration, but is, generally, hemispherical. The hemispherical shape provides an access opening 32 into the interior thereof. The side wall 30 has an upper edge 31 encircling the opening 32.

A circular recessed ridge 34 is formed on the side wall 30 slightly below the upper edge 31. At least one threaded mounting stud or mounting post 39 is provided on and integrally formed with the side wall 30. The post 39 has an open end 40. The open end 40 is co-planar with or slightly below the ridge 34.

A light socket 36 is mounted to the side wall 30 and is disposed within the interior of the turn signal. The socket 30 is in electrical communication with the electrical system (not shown) of the motorcycle (not shown). A light bulb 38 is received in the light socket 36 within the side wall 30.

The lens 12 is shaped such that it fits inside the upper edge 31 of the turn signal assembly 28 and seats on the ridge 34. The lens 12 has a thickness no greater than the distance from the ridge 34 to the upper edge 31, such that the lens 12 can seat on the ridge 34 and not project above the upper edge 31.

The lens 12 has at least one countersunk opening 20 (two of which are shown at 20 and 20-Prime) formed therethrough. A second threaded fastener, such as a screw (not shown), projects through the second opening 20 and threadably engages the post 39 through its open end 40, thus securing the lens 12 to the turn signal assembly 28.

It is to be appreciated that when the turn signal is activated, the light bulb 38 is lit. The light therefrom reflects off the side wall 30 and through the lens 12 and through the openings 15 of the decorative cover 14 and, thus, does not impair the function of the turn signal while the cover 14 imparts an aesthetic appearance to the turn signal.

The present invention enables the integration of an existing decorative appointment into a decorative appointment for a turn signal enabling a matching for the entire vehicle.

Having thus described the present invention, what is claimed is:

1. A motorcycle turn signal lens cover assembly, the assembly comprising:

(a) a motorcycle turn signal lens, the lens having a threaded central first opening formed therethrough;

(b) a decorative cover which overlies the lens; and (c) a threaded fastener for interconnecting the cover to the lens through the central first opening.

2. The assembly of claim 1 further comprising:

second fastening means, and wherein the lens has at least one second opening formed therethrough, and wherein the second fastening means secures the lens to a motorcycle turn signal through the at least one second opening.

3. In combination:

(a) a motorcycle turn signal assembly, and (b) a lens cover assembly for the turn signal assembly, the lens cover assembly comprising the assembly of claim 1.

4. The combination of claim 3 wherein:

the first opening is a threaded opening and the means for interconnecting comprises a threaded fastener which interconnects the decorative cover to the lens.

5. The combination of claim 4 further comprising second fastening means, and wherein the lens has at least one second opening formed therethrough, and wherein the second fastening means secures the lens to a motorcycle turn signal through the at least one second opening.

6. In a motorcycle turn signal assembly of the type comprising a housing and a translucent lens covering the housing, the improvement comprising:

(a) a translucent lens having a threaded central opening formed therethrough;

(b) a decorative cover overlying the lens; and (c) fastening means for interconnecting the decorative cover to the lens.

7. The assembly of claim 6 wherein the decorative cover has a central threaded aperture formed therein, and the fastening means threadably engages the central threaded opening of the lens and the cover threaded aperture.

* * * * *